(12) United States Patent
Chang et al.

(10) Patent No.: US 7,289,981 B2
(45) Date of Patent: Oct. 30, 2007

(54) USING TEXT SEARCH ENGINE FOR PARAMETRIC SEARCH

(75) Inventors: Yuan-Chi Chang, Ossining, NY (US); Howard C. Chin, North York (CA); Chung-Sheng Li, Scarsdale, NY (US); Carsten E. Mytroen, Markham (CA)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 10/316,312

(22) Filed: Dec. 10, 2002

(65) Prior Publication Data

US 2004/0111401 A1 Jun. 10, 2004

(51) Int. Cl.
G06F 17/30 (2006.01)
(52) U.S. Cl. .............................. 707/3; 707/1
(58) Field of Classification Search ............... 707/1–7, 707/10, 100–102, 200–203
See application file for complete search history.

(56) References Cited

U.S. PATENT DOCUMENTS 6,708,189 B1 * 3/2004 Fitzsimons et al. ......... 707/205
6,820,076 B2 * 11/2004 Bailey et al. .................. 707/3

* cited by examiner

*Primary Examiner*—Don Wong
*Assistant Examiner*—Marcin Filipczyk
(74) *Attorney, Agent, or Firm*—Ido Tuchman; Anne Dougherty

(57) ABSTRACT

A method, system, and computer program for enabling parametric searches on source data using text search engine. The invention is generally divided into a build-time process and a run-time process. During the build-time process, a crawler extracts data units from source data. A data translator then translates data units into keyword parametric entries that are submitted to the text search engine. During the run-time process, a query translator translates parametric search queries into keyword search entries. A metadata refiner then filters intermediate search results from the search engine based on the parametric search query.

19 Claims, 5 Drawing Sheets

USING TEXT SEARCH ENGINE FOR PARAMETRIC SEARCH

FIELD OF THE INVENTION

The present invention relates generally to information searching techniques, and, more specifically, to an information search engine supporting both keyword searches and parametric searches.

BACKGROUND

As more and more information continues to be stored and transferred digitally, electronic search engines used to locate desired data are becoming essential tools in computer network environments. There are, generally, two types of modern search engines technologies currently in use: keyword search engines and parametric search engines.

Keyword search engines are typically used to search for data in unstructured documents. Unstructured documents often contain information that is not formatted into any predefined manner. Such documents may include disparate information loosely arranged into paragraphs, lists, tables and other layouts. Unstructured documents may include Hypertext Markup Language (HTML) pages, Portable Document Format (PDF) documents, and word processor documents.

In general, keyword search engines comb through unstructured documents and store keywords in a text index. The index record is associated with a network location and, often times, additional metadata about the document. When a user submits a keyword search, the search engine examines its records and returns the network locations of documents matching the keyword search. Some popular keyword search engines include Google (R), Inktomi (R), and AltaVista (R). Google is a registered trademark of Google Incorporated, Inktomi is a registered trademark of Inktomi Corporation, and AltaVista is a registered trademark of the AltaVista Company.

Parametric search engines, on the other hand, are typically used to search through structured documents. Structured documents often contain information formatted into predefined categories or fields. Structured documents are analogous to a telephone book containing listings in a specific arrangement. One example of a structured document is a database document. Databases typically format information into tables containing related parameters grouped together to form a database entry. Because of the organized nature of structured documents, they are particularly conducive to parametric searches. Parametric searches often involve arithmetic operators, such as less than (<), greater than (>), and equal to (=) operators.

The main feature difference between the two search solutions is that text search solutions cannot generally perform parametric searches like relational database searches. A text search solution is best at matching keywords in indexed documents rather than performing range queries. It is thus typically impossible to ask text-based search engine to find cashmere sweaters that are sold for less than 100 dollars.

Relational databases, on the other hand, typically lack support to perform fast, fuzzy keyword matching. Unlike most text search solutions which are read-only, relational databases are generally transaction-based, and thus have to slow down to lock and unlock data even for read-only operations. This design puts relational databases at a disadvantage in terms of speed and scale.

Despite the aforementioned differences, it is favorable for an information source, such as an e-commerce web site, to provide both text and parametric search features. However, this feature requirement implies the information source will need to host both types of search solutions: text searches and parametric searches. From the viewpoint of reducing infrastructure management and financial cost, it is advantageous to apply a single search solution to satisfy the requirements of both features.

SUMMARY OF THE INVENTION

The present invention addresses the need of a single search solution by introducing a middleware layer on top of a generic text search solution that provides parametric search capabilities using traditional keyword search engines. The present invention has a wide range of applications for information and data searches, such as commerce catalog searches, auction list searches, web service UDDI search, and so on.

Thus, an aspect of the present invention involves a method for enabling parametric searches on source data using a text search engine. The method includes an extracting operation to extract at least one data unit from the source data. A translating operation formats the data unit into at least one keyword parametric entry. A storing operation stores the keyword parametric entry in a surrogate document.

Another method contemplated by the present invention for enabling parametric searches using a text search engine includes a receiving operation to accept a parametric query. A translating operation formats the parametric query into at least one keyword search entry. A submitting operation passes the keyword search entry to the text search engine.

A further aspect of the invention is a system for enabling parametric searches on source data using text search engine. The system includes a crawler configured to extract at least one data unit from the source data, and a data translator configured to translate the data unit into at least one keyword parametric entry.

Another system contemplated by the present invention for enabling parametric searches on source data using text search engine includes a query translator configured to translate a parametric search query into at least one keyword search entry, and a metadata refiner configured to filter intermediate search results from the search engine based on the parametric search query.

Yet another aspect of the invention is computer program product configured to extract at least one data unit from the source data, translate the data unit into at least one keyword parametric entry, and store the keyword parametric entry in a surrogate document.

Another computer program product contemplated by the present invention is configured to receive a parametric query, translate the parametric query into at least one keyword search entry, and submit the keyword search entry to the text search engine.

A further aspect of the invention is a system for enabling parametric searches on source data using text search engine. The system includes a means for translating at least one data entry into at least one keyword entry, and a means for submitting the keyword entry to the text search engine.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
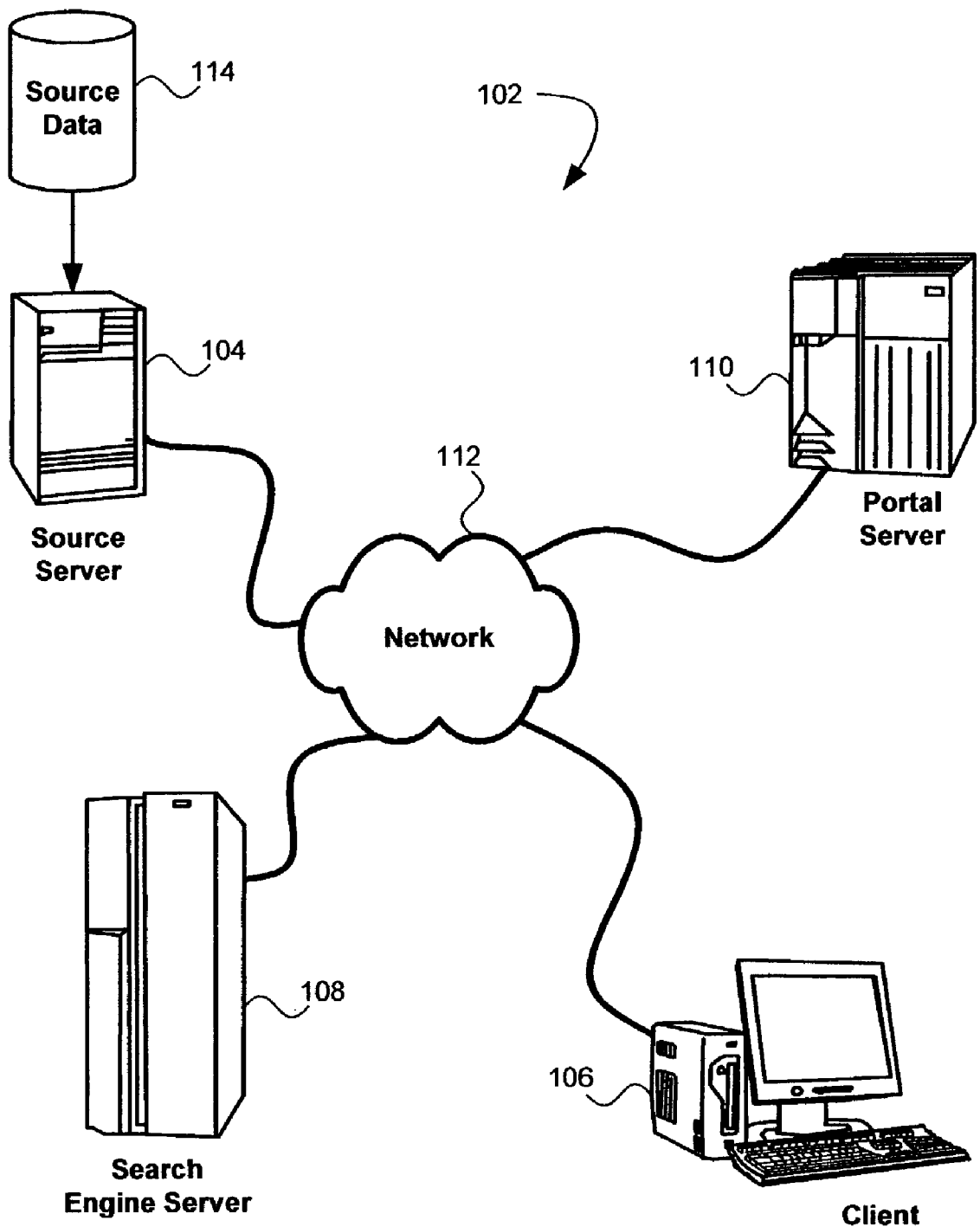
FIG. 1 shows an exemplary network environment embodying the present invention.

The present invention beneficially enables users to execute parametric searches using preexisting text search technology. As detailed below, the invention capitalizes on the behavior of such keyword search engines, adding powerful parametric search capabilities to traditional keyword search engines. The invention is described herein with reference to FIGS. 1-5. When referring to the figures, like structures and elements shown throughout are indicated with like reference numerals.

In FIG. 1, an exemplary network environment 102 embodying the present invention is shown. It is noted that the network environment 102 is presented for illustration purposes only, and is representative of countless system configurations in which the invention may be implemented. Thus, the present invention should not be considered limited to the configurations shown and discussed herein. The environment 102 includes a source server 104, a client 106 (also referred to as a user), a search engine server 108, and a portal server 110. The source server 104, client 106, search engine server 108, and portal server 110 nodes are all coupled to a computer network 112.

The computer network 112 may be any network known in the art for effectuating communications between the various nodes 104, 106, 108, 110 within the network environment 102. Thus, the network 112 can be a local area network (LAN), a wide area network (WAN), or a combination thereof. It is contemplated that the network 112 may be configured as a public network, such as the Internet, and/or a private network, and may include various topologies and protocols know to those skilled in the art.

The source server 104 can be any device capable of providing source data 114 via the network 112. As referred to herein, source data 114 is information to be searched using parametric operators, such as greater-than (>) and less-than (<) operators. In order for such parametric operators to be meaningful, it is assumed that the source data 114 contains at least one data unit having an attribute and a value. For example, consider the scenario where the source server 104 is a web server belonging to computer merchant advertising computers for sale over the Internet (network 112). Thus, the source server 104 may present web pages (source data 114) to clients 106 describing the various computers for sale by the merchant. Furthermore, the source data 114 may specify a CPU speed (attribute) of 1.4 GHz (value) for a particular computer model advertised by the merchant.

In one embodiment of the invention, the portal server 110 accesses the source server 104 over the network 112 and retrieves available source data 114. As discussed in more detail below, the portal server 110 creates surrogate documents (not shown) based on the data units contained in the source data 114. The surrogate documents are beneficially formatted to enable parametric querying by means of the search engine server 108. The portal server 110 may also be utilized to input parametric search queries from the client 106. As further detailed below, the portal server 110 transforms the parametric search queries into specially formatted keyword search entries that are passed to the search engine server 108.

The client 106 represents an entity or user employing the immediate invention to conduct a parametric search on the source data 114. The client 106 is typically a general-purpose computer, but it is contemplated that the client 106 may be any network-enabled device capable of communicating via the network 112. Thus, the client 106 may include personal digital assistants (PDAs), cellular phones, and the like.

The search engine server 108 is a generic text search engine provider configured to catalog data available on the network 112 and return network links to information matching a keyword search query. As those skilled in the art are aware, the search engine server 108 often includes an indexer, a metadata index, and an N-gram index (not shown). Typically, the indexer is configured to receive information over the network 112 and create entries in the metadata index and N-gram index for subsequent retrieval during text searches. More information about text search engine design can be found in Danny Sullivan, "Search Engine Reviews", http://searchenginewatch.com/resources/reviews.html.

The present invention is generally divided into two major components: a build-time component and a run-time component. The build-time component parses data sources 114 and creates intermediate documents adapted to facilitate parametric queries using a text search engine 108. The run-time component performs parametric searches by translating parametric search queries into keyword search entries for use with text search engines 108.

Figure 2:
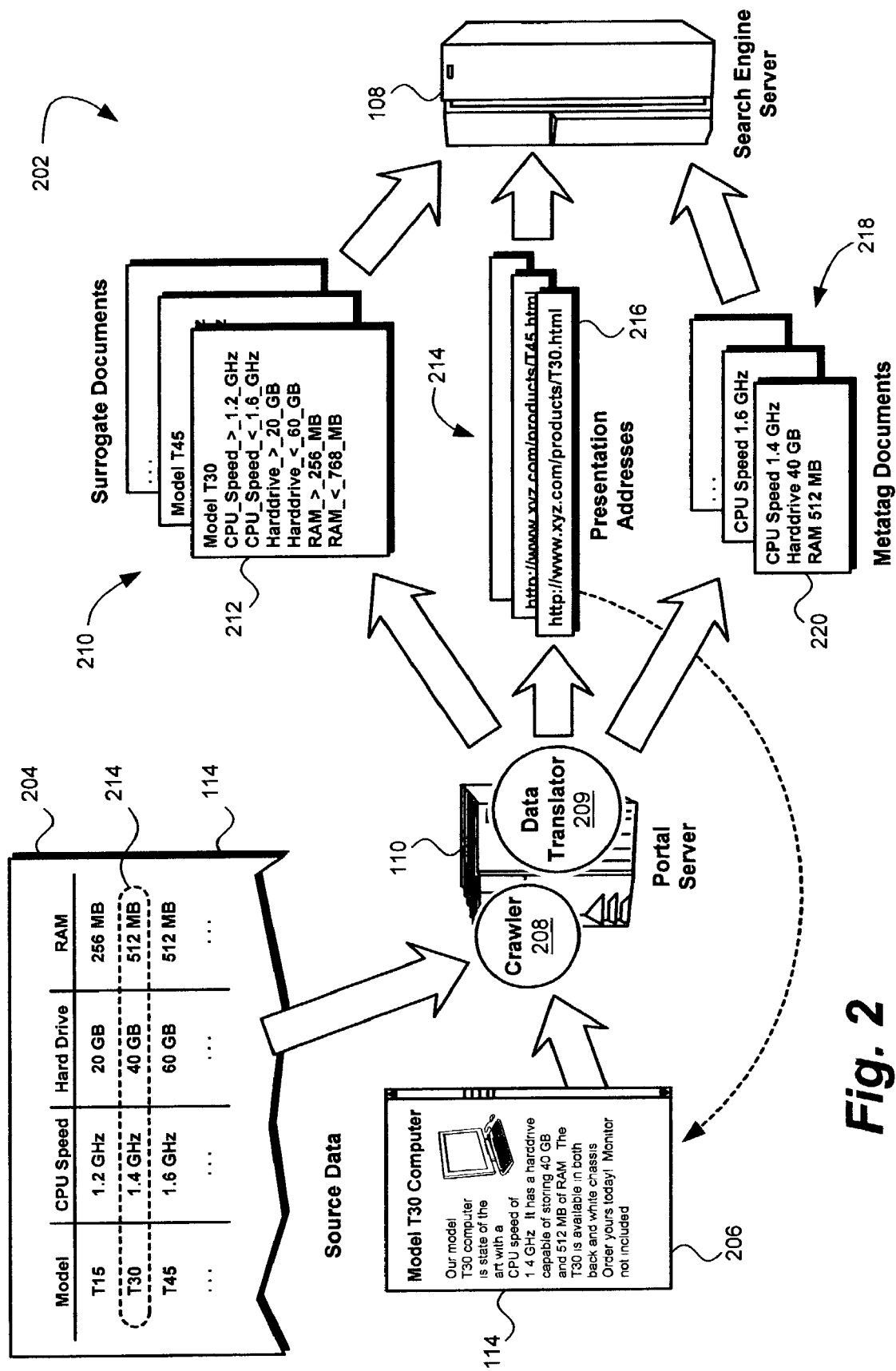
FIG. 2 shows an exemplary build-time system contemplated by the present invention.

In FIG. 2, an exemplary build-time system 202 contemplated by the present invention is shown. The build-time system 202 includes source data 114 that may comprise of structured data 204 and unstructured data 206. Structured data 204 contains data units having a predefined structure, and is typically formatted for use in database or spreadsheet applications. Unstructured data 206, on the other hand, contains data units in casual arrangement throughout the document, and is typically used in word processing applications.

A crawler 208 is configured to search through the source data 114 and find data units. In one embodiment of the invention, the crawler 208 is located at the portal server 110. The crawler 208 may use various methods known to those skilled in the art to ascertain data units. For example, the crawler 208 may search for known attribute keywords and then find the closest numeric value to the attribute word. Alternatively, the crawler 208 may be provided with information by the source server for locating data units in the source data 114.

A data translator 209 is configured to create surrogate documents 210 based on the source data 114 extracted by the crawler 208. In one embodiment of the invention, a discrete surrogate document 212 is generated for each data unit group 214 within the source data 114. A data unit group 214 can be defined as a single database row of structured data 204 or as data units in a single document containing unstructured data 206. It is contemplated that other means may be used to define data unit groups without departing from the spirit and scope of the invention.

As the data translator 209 creates surrogate documents 212 for data unit groups 214, it examines each data unit to determine if it contains a numeric value. A data unit has a numeric value if comparison operators, such as greater-than (>) or less-than (<) operators, can be performed on its value. For instance, the data unit "CPU Speed 1.4 GHz" contains a numeric value of 1.4 GHz. On the other hand, the data unit "Model T30" does not contain a numeric value.

Should a numeric value be found, the translator 209 reformats the data unit as keyword parametric entries in the surrogate document 212. In one embodiment of the invention, the keyword parametric entries are embodied as attribute-operator-value triplets in the form attribute_>_lower-interval and attribute_<_upper interval. The attribute-operator-interval triplets are created by determining a lower-interval having a value below the value of the data unit and an upper-interval above the value of the data unit. The appropriate comparison operator is then applied to each triplet. For example, the data unit "CPU Speed 1.4 GHz" may be assigned a lower-interval value of 1.2 GHz and an upper-interval value of 1.6 GHz by the data translator 209. Furthermore, the translator 209 substitutes stop characters in data unit with non-stop characters in the attribute-operator-interval triplets. A stop character is typically a white space character or other character (or a set of characters) that would cause the search engine 108 to break apart the attribute-operator-interval triplet into two or more words. In one embodiment of the present invention, the translator 209 replaces any stop characters with an underscore "_" character. Thus, the data translator 209 translates the data unit "CPU Speed 1.4 GHz" into a set of attribute-operator-interval triples "CPU_Speed_>_1.2_GHz" and "CPU_Speed_<_1.6_GHz" in the surrogate document 212. It is contemplated that other means may be used to define the format of an attribute-operator-interval triplet without departing from the spirit and scope of the invention.

As the translator 209 generates surrogate documents 210, it associates presentation addresses 214 to each surrogate document created. The presentation addresses 214 are typically network addresses that point to content related to the associated surrogate documents 210. For example, the presentation address 216 associated to the surrogate document 212 about the Model T30 computer may be a Uniform Resource Locator (URL) pointing to an HTML page 206 describing the Model T30 computer. It is contemplated that the presentation addresses 214 may include destination directives for server-sided scripts and programs.

In addition to the presentation addresses 214, the data translator 209 may also generate metadata documents 218. In a particular embodiment of the invention, each surrogate document 212 is associated with a separate metadata document 220. Typically, the metadata document 220 includes the exact values of data units that were translated in the associated surrogate document 212 to keyword parametric entries. For example, the metadata document 220 includes the entry "CPU Speed 1.4 GHz" matching the keyword parametric entries "CPU_Speed_>_1.2_GHz" and "CPU_Speed_<_1.6_GHz" in the surrogate document 212.

After the surrogate documents 210, presentation addresses 214, and the metadata documents 218 are generated, they are passed to the search engine server 108 for indexing. Typically, the search engine server 108 will store the surrogate documents 210 in an N-gram index and the metadata documents 218 in a metadata index. The specific details of how the documents and addresses are retained in the search engine server 108, however, are beyond the scope of the present invention.

Figure 3:
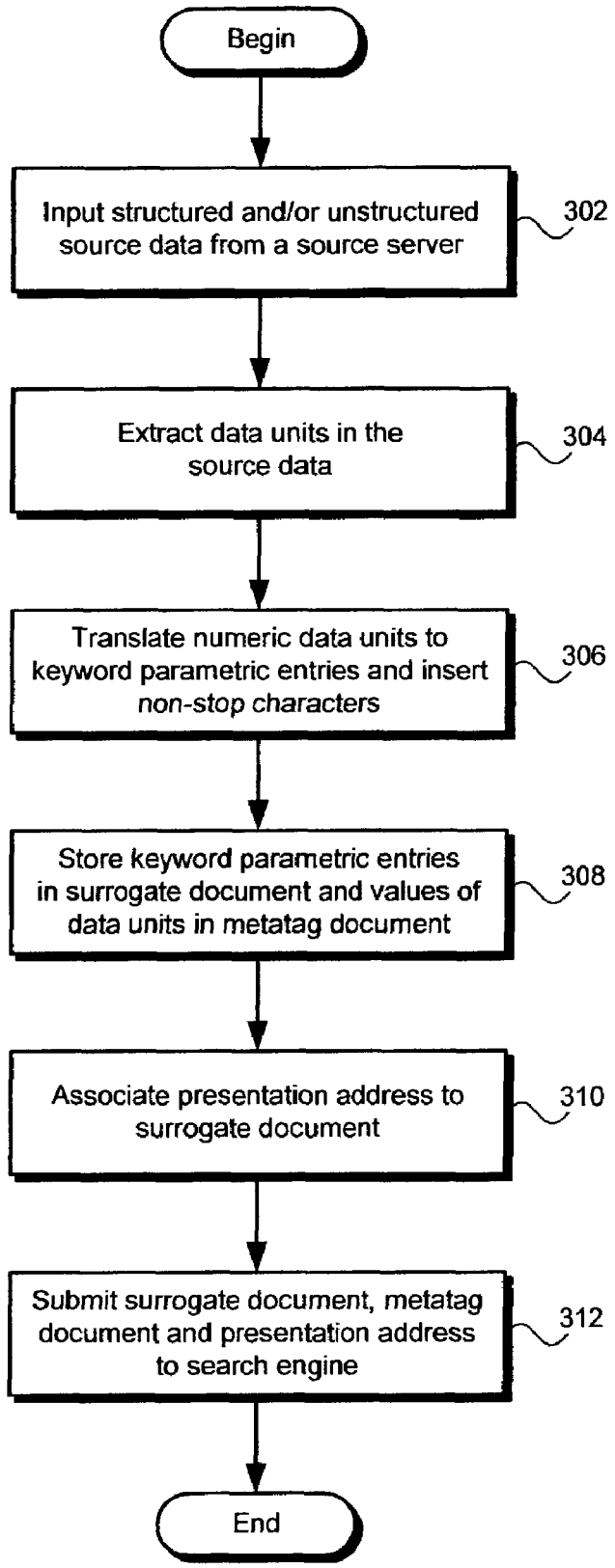
FIG. 3 shows exemplary flow chart describing the build-time process of the present invention.

In FIG. 3, an exemplary flow chart describing the build-time process of the present invention is shown. It should be remarked that the logical operations of the build-time process may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The process begins with inputting operation 302. During this operation, source data is accessed by the crawler. It is contemplated that the crawler may be configured to automatically and routinely access the source data over time. This helps ensure that the extracted data stays current as the source data changes. After the inputting operation 302 is completed, control passes to extracting operation 304.

At extracting operation 304, the crawler searches through the source data to locate data units contained within. As mentioned above, the source data may include structured and unstructured data and various techniques known to those skilled in the art may be used to parse the source data. In addition, it is contemplated that the crawler may convert data unit values from one measurement system to another during the parsing operation 304. For example, the browser may convert all values specified in English units into metric units, or vise-versa. After extracting operation 304 is completed, control flow passes to translating operation 306.

At translating operation 306, numeric data units are converted into keyword parametric entries. In particular, each numeric data unit in the form of an attribute-value pair is used to create an upper attribute-operator-interval triplet and a lower attribute-operator-interval triplet. The interval of the upper attribute-operator-interval triplet is greater than the value of the attribute-value pair and the operator of the upper attribute-operator-interval triplet is a less-than operator (<). Conversely, the interval of the lower attribute-operator-interval triplet is less than the value of the attribute-value pair and the operator of the lower attribute-operator-interval triplet is a greater-than operator (>). Attribute intervals may be determined by simply dividing the range between maximum and minimum values into any number of intervals. The sizes of the intervals need not be the same nor do they have to be contiguous. In addition, the crawler replaces any stop characters (such as spaces and punctuation marks) in the attribute-operator-interval triplets with non-stop characters (such as underscores). After translating operation 306 is completed, control flow passes to storing operation 308.

At storing operation 308, the keyword parametric entries are stored in a surrogate document and the data unit values are stored in a metadata document. It is contemplated that the surrogate and metadata documents may contain other information, such as search engine code and directives, to support document processing. Once the storing operation 308 is completed, control passes to associating operation 310.

At associating operation 310, a presentation address is partnered with the surrogate document. The presentation address is a network address pointing to user-readable information corresponding to information in the surrogate document. Typically, the presentation address is URL address to a Hypertext Markup Language (HTML) formatted document viewable using a web browser such as Netscape Navigator (R) or Microsoft (R) Internet Explorer. Netscape Navigator is a registered trademark of Netscape Communications Corporation, and Microsoft is a registered trademark of Microsoft Corporation. Once the associating operation 310 is completed, control passes to submitting operation 312.

At submitting operation 312, the surrogate document, metadata document, and presentation address are passed to the text search engine. By doing so, the information is cataloged in the search engine is available for retrieval during subsequent text search queries. The submitting operation 312 may involve transmitting the surrogate document, metadata document, and presentation address to several search engines at the same time, or submitting the information to each search engine one at a time. Once the submitting operation 312 is completed, the build-time process also completed and the system is ready to receive and process parametric queries from the user, as discussed below.

Figure 4:
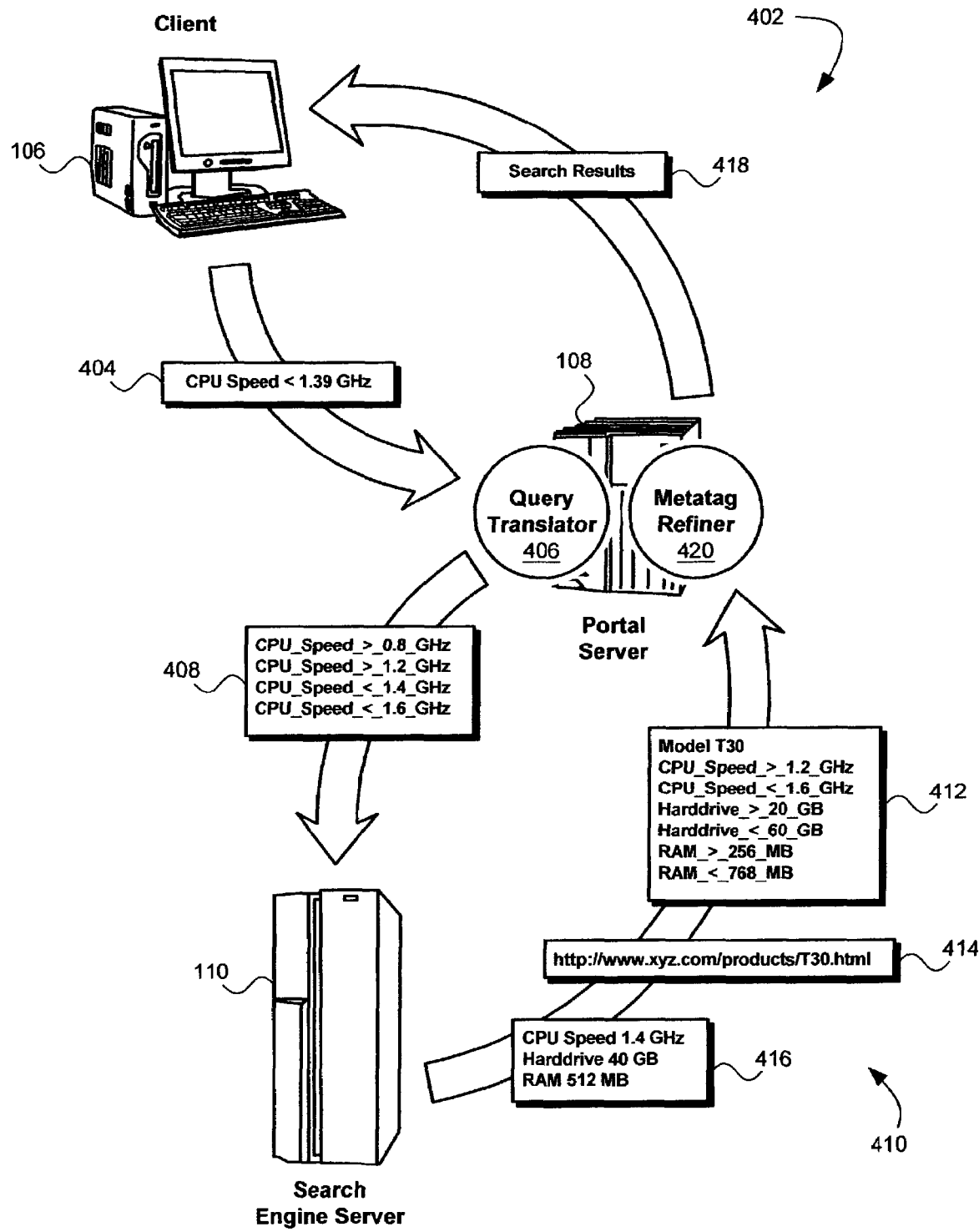
FIG. 4 shows an exemplary run-time system for receiving and processing parametric queries.

In FIG. 4, an exemplary run-time system 402 for receiving and processing parametric queries is shown. In a particular embodiment of the invention, the client 106 transmits a parametric query 404 to a query translator 406. The parametric query 404 is typically formatted as an attribute-operator-value triplet, where the operator is a parametric operator, such as the greater-than (>) or less-than (<) operator. For example, the parametric query 404 may contain the expression "CPU Speed<1.39 GHz". In this expression, "CPU Speed" is the attribute, "<" is the operator, and 1.39 GHz is the value of the triplet.

The query translator 406 is configured to reformat the parametric query 404 into one or more keyword search entries 408. In a particular embodiment of the invention, the query translator 406 is a component of the portal server 108, however it is contemplated that the query translator 406 may be located elsewhere in the run-time system 402. The query translator 406 examines the value of the attribute-operator-value keyword parametric query 404 and determines search intervals to include in the keyword search entries 408. The search intervals may be determined using a predefined algorithm or by using information gathered during the build-time process described above. For example, the query translator 406 may be aware that only even values of the CPU Speed intervals are submitted to the search engine 110 for indexing during the build-time process.

The query translator 406 is also configured to replace stop characters in the parametric query 404 with non-stop characters in the keyword search entries 408. Thus, in one embodiment of the invention, the query translator 406 substitutes white spaces in the parametric query 408 with underscores (_) in the keyword search entries 408. The query translator 406 may additionally convert values from one measurement system to another to ensure compatibility with the build-time process.

The keyword search entries 408 are submitted to the search engine 110 as keyword queries for processing. As mentioned above, the search engine 110 includes indexing capabilities to search and retrieve stored information matching a keyword search. Specifically, the search engine 110 returns intermediate results 410 that correspond to the keyword search entries 408. The intermediate results 410 typically comprise of a surrogate document result 412, a presentation address result 414, and a metadata document result 416.

The surrogate document result 412 includes various attribute-operator-interval triplets that match, at least partially, the keyword search entries 408. A presentation address result 414 is associated with each surrogate document result 412, and points to a network location related to the surrogate document result 412. The intermediate results 410 may also include a metadata document result 416 that contains attribute-value pairs with the exact values of the original source data. In one embodiment of the invention, the intermediate results 410 are simply passed to the client 106 as the search results 418 for the parametric query 404.

In another embodiment of the invention, the intermediate results 410 are first analyzed by the portal server 108 using a metadata refiner 420. The metadata refiner 420 checks the intermediate results 410 against the parametric query 404 to determine if the results do indeed satisfy the query requirements. Specifically, the metadata refiner 420 compares the metadata document result 416 against the parametric query 404. For example, the parametric query "CPU Speed<1.39 GHz" may yield an intermediate result 410 for a computer product having a CPU Speed of 1.4 GHz, as shown in FIG. 4. Since the exact 1.4 GHz value is contained in the metadata document result 416, the metadata refiner 420 can filter out this intermediate result 410 since it does not satisfy the original parametric query 404. In this embodiment of the invention, the intermediate results 410 that pass through the metadata refiner 420 are sent to the client as search results 418 for the parametric query 404.

Figure 5:
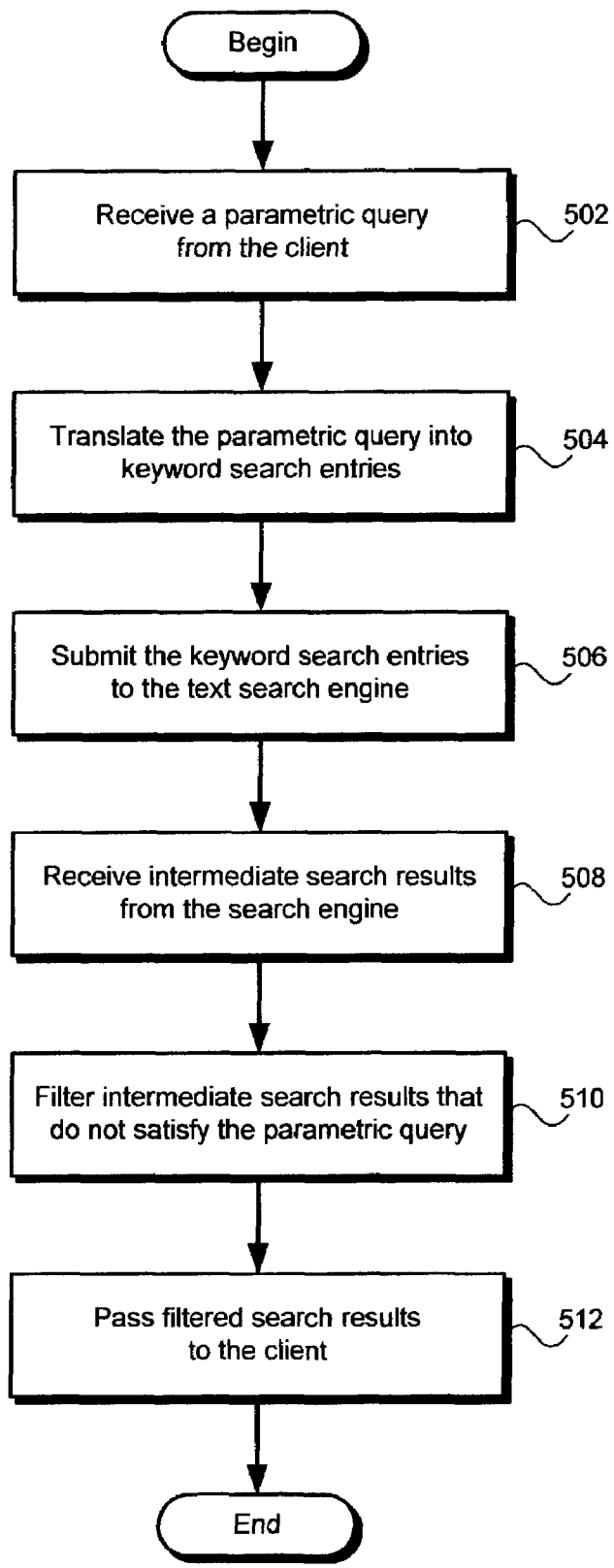
FIG. 5 shows an exemplary flow chart describing the run-time process as contemplated by the present invention.

In FIG. 5, an exemplary flow chart showing an embodiment of the run-time process is presented. The process begins with receiving operation 502. During this operation, the portal server receives a parametric query from the client. It is contemplated that the parametric query may include several attribute-operator-value triplets combined using logical expressions, such as "and", "or", and "not" expressions. After the parametric query is received, control flow transfers to translating operation 504.

At translating operation 504, the parametric query is translated into at least one keyword search entry. The translating operation 504 is generally achieved by determining an upper-interval and a lower-interval based on the value of the parametric query. The intervals may be determined using preset rules, or from information gathered from the build-time process. The intervals are then applied to create keyword search entries. In one embodiment of the invention, the keyword search entries are formatted as attribute-operator-interval triplets. Furthermore, any stop characters in the parametric query are replaced with non-stop characters in the keyword search entries. If logical expressions were present in the parametric query, it is contemplated that keyword search entry may be formatted to reflect the logical expressions. After translating operation 504 is completed, control flow passes to submitting operation 506.

At submitting operation 506, the keyword search entries are submitted to at least one keyword search engine. The search engine conducts a keyword search using the entries by searching through indexed content to find data matching the submitted keyword entries. After the submitting operation 506 is completed, control passes to receiving operation 508.

At receiving operation 508, the portal server receives intermediate search results from the search engine. The intermediate search results may include keyword parametric entries, presentation addresses, and metadata. As mentioned above, the intermediate search results may used as the final search results for the parametric query, or control may pass to filtering operation 510 for further processing.

At filtering operation 510 the intermediate search results are scrutinized to determine if they actually satisfy the original parameter query received by the portal server. This is achieved by comparing the metadata of each intermediate search result against the parameter search. If the metadata reveals that the intermediate search result does not satisfy the original parameter query, that particular intermediate search result is discarded or otherwise flagged as not satisfying the parameter query. The filtered search results are then transmitted to the client as the final parametric search results at passing operation 512.

At passing operation 512 the filtered search results are transmitted to the client. This operation includes passing the presentation address to client, and may additionally include passing the metadata and/or the keyword parametric entries of each filtered search result.

The foregoing description of the invention has been presented for purposes of illustration and description. It is not intended to be exhaustive or to limit the invention to the precise form disclosed, and other modifications and variations may be possible in light of the above teachings. For example, other encoding schemes may be utilized besides the attrbute_operator_interval triplet described above. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for enabling parametric searches on source data using a text search engine, the method comprising:
   extracting at least one data unit from the source data;
   automatically translating the data unit into at least one keyword parametric entry; and
   storing the keyword parametric entry in a surrogate document at a search engine server; and
   wherein translating the data unit into the keyword parametric entry includes determining an upper-interval and a lower-interval encompassing a value of the data unit.

2. The method of claim 1, wherein translating the data unit into the keyword parametric entry includes forming attribute-operator-interval triplets based on the data unit.

3. The method of claim 1, wherein translating the data unit into the keyword parametric entry includes replacing stop characters in the data unit with non-stop characters in the keyword parametric entry.

4. The method of claim 1, further comprising storing a value of the data unit in a metatag document.

5. The method of claim 1, further comprising associating a presentation address associated with the surrogate document.

6. The method of claim 1, further comprising submitting the surrogate document to the text search engine.

7. The method of claim 6, further comprising:
   receiving a parametric query;
   translating the parametric query into at least one keyword search entry; and
   submitting the keyword search entry to the text search engine.

8. The method of claim 7, further comprising:
   receiving at least one intermediate search result from the search engine, the intermediate search result including a data unit value; and
   filtering the intermediate search result based on the parametric query.

9. The method of claim 1, wherein the source data includes data without a predefined structure.

10. A system for enabling parametric searches on source data using text search engine, the system comprising:
    a crawler configured to extract at least one data unit from the source data; and
    a data translator configured to automatically translate the data unit into at least one keyword parametric entry, the data translator further configured to determine an upper-interval and a lower-interval encompassing a value of the data unit; and
    a search engine server configured to store the keyword parametric entry in a surrogate document.

11. The system of claim 10, wherein the data translator is further configured to submit the keyword parametric entry to the text search engine.

12. The system of claim 10, wherein the keyword parametric entry is formatted as an attribute-operator-interval triplet.

13. The system of claim 10, further comprising:
    a surrogate document including the parametric entry;
    a presentation address associated with the surrogate document; and
    a metatag document including a value of the data unit.

14. The system of claim 10, further comprising a query translator configured to translate a parametric search query into at least one keyword search entry.

15. The system of claim 14, further comprising a metatag refiner configured to filter intermediate search results from the search engine based on the parametric search query.

16. The system of claim 15, wherein the query translator is further configured to form attribute-operator interval triplets based on the parametric search query.

17. The system of claim 10, wherein the source data includes data without a predefined structure.

18. A computer program product embodied in a tangible media comprising:
    computer readable program codes coupled to the tangible media for enabling parametric searches on source data using text search engine, the computer readable program codes configured to cause the program to:
    receive a parametric query from a client;
    extract at least one data unit from the source data;
    executing instructions to automatically translate the data unit into keyword parametric entries;
    store the keyword parametric entry in a surrogate document at a search engine server;
    submit to the client at least one result of a search conducted by the text search engine based on the keyword search entry; and
    wherein the keyword parametric entries include an upper interval and a lower interval encompassing a value of the data unit.

19. A system for enabling parametric searches on source data using a text search engine, the system comprising:
    means for extracting at least one data unit from the source data;
    means for automatically translating the at least one data unit into keyword parametric entries, the keyword parametric entries include an upper interval and a lower interval encompassing the value of the data unit;
    means for storing the keyword parametric entries in a surrogate document at a search engine server; and
    means for submitting the keyword entry to the text search engine.

* * * * *